US012583111B2

(12) United States Patent     (10) Patent No.:   US 12,583,111 B2
Jain et al.     (45) Date of Patent:    Mar. 24, 2026

(54) EYE-ON-HAND REINFORCEMENT LEARNER FOR DYNAMIC GRASPING WITH ACTIVE POSE ESTIMATION

(71) Applicant: Mitsubishi Electric Research Laboratories, Inc., Cambridge, MA (US)

(72) Inventors: Siddarth Jain, Cambridge, MA (US); Baichuan Huang, Piscataway, NJ (US); Jingjin Yu, Edison, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 249 days.

(21) Appl. No.: 18/472,767

(22) Filed: Sep. 22, 2023

(65) Prior Publication Data

US 2025/0100141 A1     Mar. 27, 2025

Related U.S. Application Data

(60) Provisional application No. 63/580,744, filed on Sep. 6, 2023.

(51) Int. Cl.
    B25J 9/16       (2006.01)
    B25J 19/02     (2006.01)
(52) U.S. Cl.
    CPC ............. B25J 9/1664 (2013.01); B25J 9/161 (2013.01); B25J 9/163 (2013.01); B25J 9/1671 (2013.01); B25J 9/1697 (2013.01); B25J 19/023 (2013.01)
(58) Field of Classification Search
    None
    See application file for complete search history.

(56) References Cited

U.S. PATENT DOCUMENTS 9,924,213 B2    3/2018   Kelsen et al.
10,800,040 B1 *   10/2020   Beckman ............... B25J 9/1605
2020/0061811 A1 *   2/2020   Iqbal ........................ G06N 3/08
          (Continued)

FOREIGN PATENT DOCUMENTS

JP     2021084210 A   *   6/2021

OTHER PUBLICATIONS

Plappert, Asymmetric Self-Play for Automatic Goal Discovery in Robotic Manipulation (Year: 2021).*
          (Continued)

*Primary Examiner* — Arslan Azhar
(74) *Attorney, Agent, or Firm* — Gene Vinokur

(57)           ABSTRACT

A controller is provided for performing dynamic grasping of a target object using visual sensory inputs. The controller includes a robotic interface connected to a robotic arm including links connected by joints having actuators and encoders, and a gripper of the end-effector of the robotic arm configured to grasp the target object in response to robot control signals, and a vision sensor configured to continuously provide visual observations for tracking poses of the target object in a workspace and compute grasp poses, wherein the vision sensor is mounted on a distal end of the robotic arm adjacent to the gripper. The controller trains the Eye-on-Hand reinforcement learner policy, tracks the poses of the target object, and generates robot control signals to follow the target object while keeping it in the field of view of the vision sensor and grasp the target object in the workspace.

19 Claims, 10 Drawing Sheets

100

(56) References Cited

U.S. PATENT DOCUMENTS

| 2021/0118166 A1* | 4/2021 | Tremblay | ................. | G06T 7/70 |
| 2024/0316763 A1* | 9/2024 | Hoffman | ................. | B25J 9/106 |
| 2025/0214249 A1* | 7/2025 | Hosomi | ................ | B25J 9/1697 |

OTHER PUBLICATIONS

Akinola, Iretiayo, et al. "Dynamic grasping with reachability and motion awareness." 2021 IEEE/RSJ International Conference on Intelligent Robots and Systems (IROS). IEEE, 2021.
Morrison, Douglas, Peter Corke, and Jürgen Leitner. "Closing the loop for robotic grasping: A real-time, generative grasp synthesis approach." arXiv preprint arXiv:1804.05172 (2018).

* cited by examiner

Static

Line

Oval

Random

| A\|R | M | Success | Failure | Timeout | Collision | Out-of-View |
|------|---|---------|---------|---------|-----------|-------------|
| B\|R1 | S | 94.90 | 5.10 | 0.20 | 4.90 | 0.00 |
|       | L | 90.76 | 9.24 | 2.30 | 6.54 | 0.40 |
|       | O | 86.54 | 13.46 | 1.14 | 5.30 | 7.02 |
|       | R | 70.28 | 23.72 | 5.34 | 12.22 | 6.16 |
| E\|R1 | S | 95.76 | 4.24 | 4.20 | 0.00 | 0.04 |
|       | L | 95.00 | 5.00 | 4.74 | 0.00 | 0.26 |
|       | O | 96.50 | 3.50 | 2.12 | 0.70 | 0.68 |
|       | R | 97.80 | 2.20 | 0.00 | 0.00 | 1.00 |
| B\|R2 | S | 95.90 | 4.10 | 2.32 | 1.78 | 0.00 |
|       | L | 95.08 | 4.92 | 2.90 | 1.76 | 0.24 |
|       | O | 83.24 | 16.76 | 7.32 | 3.86 | 5.58 |
|       | R | 71.92 | 28.08 | 13.76 | 7.80 | 6.50 |
| E\|R2 | S | 96.72 | 3.28 | 3.08 | 0.00 | 0.20 |
|       | L | 92.98 | 7.02 | 5.56 | 0.50 | 0.96 |
|       | O | 95.58 | 4.42 | 2.32 | 1.10 | 1.00 |
|       | R | 95.48 | 4.52 | 0.64 | 3.18 | 0.70 |

Fig. 9

| Object Motion Type | Baseline Success | EARL Success |
|---|---|---|
| Static | 85.00 | 100.00 |
| Line | 75.00 | 90.00 |
| Oval | 65.00 | 85.00 |
| Random | 70.00 | 90.00 |
| Random (switch) | 70.00 | 90.00 |
| Complex (switch) | 70.00 | 80.00 |

Fig. 10

EYE-ON-HAND REINFORCEMENT LEARNER FOR DYNAMIC GRASPING WITH ACTIVE POSE ESTIMATION

FIELD OF THE INVENTION

The present invention is related generally to a system and controller that endows Eye-on-Hand robotic arm systems with the capability for performing tracking and grasping of moving target objects.

BACKGROUND

Robotic manipulation of everyday objects in dynamic environments constitutes a fundamental skill for enabling the next generation of advanced robotic systems. Providing robots with six degrees of freedom (DoF) pose tracking and grasping capability in unstructured and dynamic environments beyond static tabletop scenarios can benefit many automation applications. For example, a human handing over an object to the robot, assembly of industrial parts, etc.

Autonomous grasping and manipulation of objects in stationary settings have been studied extensively, where the object is not moving. Dynamic environments bring many challenges for performing grasping. First, the target object might move with an unknown motion, which requires understanding and predicting the object's motion or continuous tracking and active following by the manipulator. Second, computed motion plans can become obsolete, and thus dynamic environments require online or fast replanning. Additionally, the approach direction for grasp planning changes with the object's motion, and therefore, a stable grasp can become unreachable and unstable as the target object moves. Active perception implies computer vision with a movable camera, which can intelligently alter the viewpoint of the camera to improve the system's performance. Active perception is required for dynamic grasping with Eye-on-Hand (EoH) systems, as the robot can lose track of the target object because of the robot's motion or as the target moves away from the field of view (FoV) of the camera.

A supermajority of current vision-based manipulation systems typically utilizes cameras fixated above the workspace. Thus, the perception subsystem (e.g., RGB-D cameras) and the manipulation system (e.g., robot arms) are decoupled. Such settings implicitly assume ideal viewing distances and angles for focusing on target objects. This fixation may require large clearances above/around the workspace, rendering the overall system inflexible and unsuitable for some applications, especially when occlusions are unavoidable or spaces are confined, e.g., retrieving a condiment jar in a cabinet or performing an inspection in a pipe using a snake-like robot. Such decoupling can cause occlusions or loss of tracking in many scenarios, especially when the target object is moving. Thus, mounting a camera on the wrist of a manipulator can be an alternative. In some cases, the vision sensor is mounted on the robot arm near the end-effector; however, pose tracking in the past has been carried out afar with another static workspace camera, rendering the perception process decoupled from the object manipulation operation.

Vision-based robotic grasping solutions can categorize along several dimensions. Model-based approaches rely upon knowledge about the target object, e.g., a CAD model. Model-free methods directly propose grasp candidates and aim for generalization to novel objects. Analytic or geometric methods analyze the shape of a target object for grasp pose identification. Data-driven grasp synthesis uses learning and has significantly progressed due to better learning methods and data availability. Some approaches sample and rank grasp candidates using deep neural networks. Reinforcement Learning approaches find applicability for grasp synthesis, where suitable candidates are learned and validated with repeated interactions in a simulation or real environment. However, many end-to-end RL based methods for grasping interactions require vast data for training or only work with a discrete action set. Many methods are characterized by constrained state-action spaces, for example, focusing on top-down grasping in 4-DoF, and thus are limited in task scope.

Grasping in dynamic environments presents additional challenges and requires the robot's motion and grasp planning to be adaptive and real-time. A generative grasping convolutional neural network for fast closed-loop grasping in slightly moving scenes can work for 4-DoF top-down grasping but has high requirements for data annotation. One common approach for dynamic grasping involves motion prediction for the target object to improve success. The motion prediction ability can be helpful in both planning a grasp and approaching the object. A reachability and motion awareness solution implements a recurrent neural network (RNN) for modeling and predicting object motion that works for linear, sinusoidal, and circle trajectories. However, it could be of poor generalization in unseen and complex trajectories, e.g., random movements, and the solution uses a position-fixed camera.

There is a need to relax some of the assumptions and address the challenges mentioned above by tackling robotic grasping with an "Eye-on-Hand" (EoH) system, where the sensory perception system is coupled with the manipulator.

SUMMARY OF THE INVENTION

Some embodiments of the present invention provide a method that performs dynamic grasp synthesis in full six degrees of freedom (DoF) to grasp a target object from a broader range of unstructured settings beyond the tabletop scenario and performs tracking of novel objects with a wrist-mounted camera for dynamic grasping with continuous actions of the robotic arm generated with a curriculum-trained model-free reinforcement learning policy.

In the dynamic grasping problem, a moving target object is to be grasped and lifted and the object pose, and motion is not known a priori and must be estimated with visual observations. The present invention discloses a novel approach and apparatus that endows Eye-on-Hand (EoH) systems with the capability to track and grasp moving target objects. This document describes techniques that formulate the problem of full 6-DoF dynamic grasping of novel objects with no prior knowledge of the objects' motion profiles. In at least one embodiment, the EoH system comprises a high-DOF robotic manipulator, an end-effector, and a wrist-mounted sensory perception system that is fixated on the manipulator near the end-effector. The coupling between the perception and manipulation subsystems means that such an EoH system can operate without workspace constraints and visual occlusions faced by most existing systems using an external camera. In at least one embodiment, the workspace is the area reachable by the robotic arm to grasp a desired target object. In at least one embodiment, the system uses an RGB-D camera input as the vision sensor for visual observations. The visual observations include image data obtained from the camera, and the image data comprises one or more channels. In at least one embodiment, the visual observations can be used to learn feature maps that represent the high-level features of the input image. These feature maps contain abstract representations of the image, an encoding information relevant to the task. In another embodiment, the visual observations can be encoded as a spatial location of the target object as a six-dimensional (6D) pose of the target object in the workspace indicative of a position and orientation of the target object relative to the camera frame, or the gripper, or the base frame of the robotic arm. The base frame is attached to the base of the robotic arm and the gripper frame is attached to the end-effector. The camera coordinate frame is attached to the camera and the transformation from the camera frame to the base frame of the robot is determined. The method performs active pose tracking to encode visual observations and performs the training through a carefully designed curriculum to overcome the challenges faced by dynamic grasping with an Eye-on-Hand system. The method comprises of active pose tracking, grasp pose computation and adaptation, and a curriculum-trained reinforcement learning-based policy. We propose a curriculum-trained model-free RL-based method with a wrist-mounted camera for picking a moving object with continuous actions. Our proposed method, called Eye-on-hAnd Reinforcement Learner (EARL), approaches the target with the constraint of keeping the target object in the FoV of the moving camera, despite drastically changing distances and view angles between the camera and the target object. Our approach does not limit the grasp synthesis to a top-down direction and generalizes well for unseen and complex trajectories. Through extensive evaluation, we demonstrate that EARL robustly and effectively tracks and approaches the moving target object until successful grasping is realized. An evaluation of the approach is provided in simulation and real-world robot experiments. In an embodiment, the techniques described herein are shown to achieve a high success rate for dynamic grasping of various commonly used objects in extensive experiments. In at least one embodiment, the model is trained purely in simulation and works in the real world with direct sim-to-real adaptation.

Some embodiments of the present invention provide a controller for performing dynamic grasping of a target object using a robotic arm based on visual sensory inputs. The controller may include a data input/output interface configured to receive state measurements of a robotic arm and the target object from sensors arranged on the robotic arm, wherein the robotic arm includes links connected by joints having actuators and encoders, and a gripper of the end-effector of the robotic arm configured to grasp the target object in response to robot control signals, wherein the sensors include a vision sensor configured to continuously provide visual observations for tracking poses of the target object in a workspace and compute grasp poses, wherein the vision sensor is mounted on a distal end of the robotic arm adjacent to the gripper; a memory configured to store an Eye-on-Hand (EoH) reinforcement leaner (EARL) policy, a physics-based simulator, an arm motion generation program; and a processor, in connection with the memory, configured to perform steps of: training the Eye-on-Hand reinforcement learner policy; tracking the poses of the target object moving in the workspace based on the state measurements; computing a set of grasp poses on the target object and dynamically selecting a desired grasp pose on the target object moving in the workspace; computing robotic arm motion commands using the trained Eye-on-Hand reinforcement learner policy; generating robot control signals based on the computed robotic arm motion commands; and transmitting, via the data input/output interface, the robot control signals to the actuators of the joints and the gripper to follow the target object while keeping the target object in a field of view of the vision sensor and grasp the target object in the workspace.

Further, according to some embodiments of the present invention, a system is provided for performing dynamic grasping of a target object using visual sensory inputs. The system may include a robotic arm including links connected by joints having actuators and encoders, and a gripper of the end-effector of the robotic arm configured to grasp the target object in response to robot control signals; a vision sensor configured to continuously provide/generate visual observations (images or image signals) for tracking poses of the target object in a workspace and compute grasp poses, wherein the vision sensor is mounted on a distal end of the robotic arm adjacent to the gripper; a memory configured to store an Eye-on-Hand (EoH) reinforcement leaner (EARL) policy, a physics-based simulator, an arm motion generation program; and a processor, in connection with the memory, configured to perform steps of: training the Eye-on-Hand reinforcement learner policy; tracking the poses of the target object moving in the workspace; computing a set of grasp poses on the target object and dynamically selecting a desired grasp pose on the target object moving in the workspace; computing robotic arm motion commands using the trained Eye-on-Hand reinforcement learner policy; generating robot control signals based on the computed robotic arm motion commands; and transmitting robot control signals to the actuators of the joints and the gripper to follow the target object while keeping it in the field of view of the vision sensor and grasp the target object in the workspace.

BRIEF DESCRIPTION OF THE DRAWING

The accompanying drawings, which are included to provide a further understanding of the invention, illustrate embodiment of the invention and together with the description serve to explain the principle of the invention. The drawings shown are not necessarily to scale, with emphasis instead generally being placed upon illustrating the principles of the presently disclosed embodiments.

FIG. 9 shows simulation experiment results (all values in %), where AR refers to the algorithm (baseline or EARL) and the robot 6-DoF (R1) or 7-DoF (R2), and M refers to motion pattern type static(S), linear (L), oval (O), random (R), according to embodiments of the present invention; and FIG. 10 shows real-world experiment results (all values in %), where 20 trials were performed for each test case on a real robot as the EoH system, according to embodiments of the present invention.

DETAILED DESCRIPTION OF THE PREFERRED EMBODIMENTS

Figure 1:
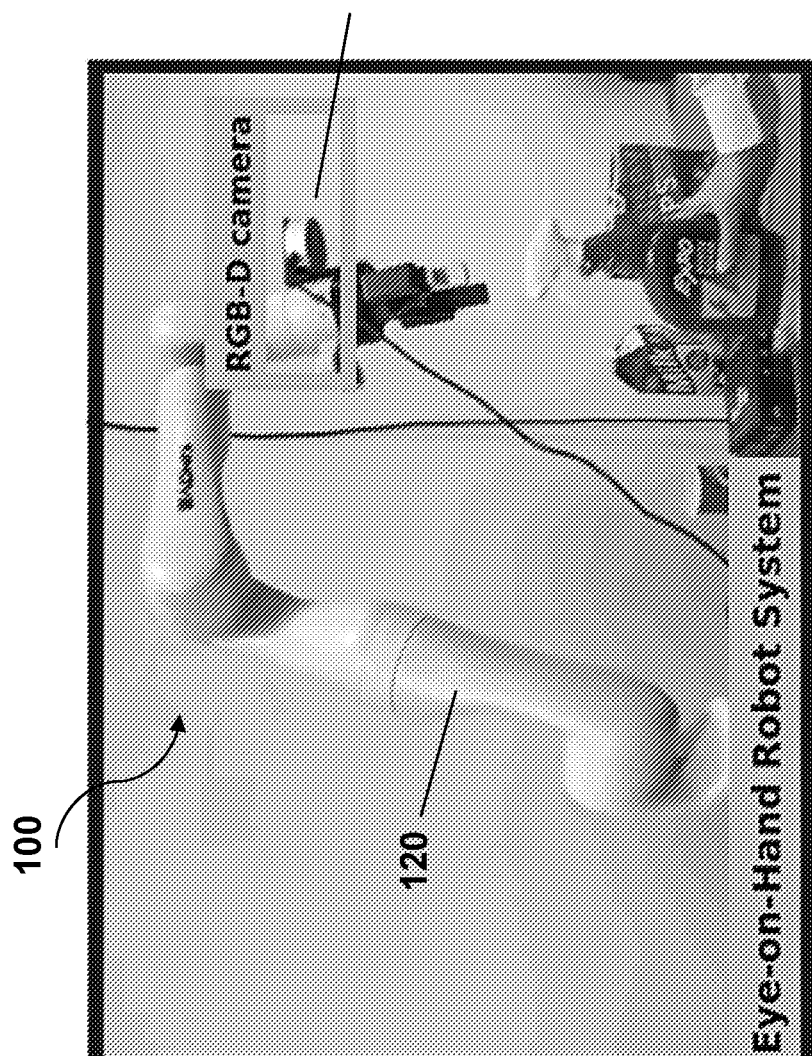
FIG. 1 shows an Eye-on-Hand (EoH) robotic system with a robotic manipulator and a wrist mounted camera.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiment of the invention.

This work endows Eye-on-Hand (EoH) systems with the capability to track and grasp moving target objects. The EoH system comprises a high-DOF robotic manipulator, an end-effector, and a wrist-mounted sensory perception system that is fixated on the manipulator near the end-effector. The coupling between the perception and manipulation subsystems means that such an EoH system can operate without workspace constraints and occlusions faced by most existing systems using an external camera.

This invention introduces a high-performance manipulation framework for Eye-on-Hand (EoH) robotic systems consisting of proposed active pose tracking with a moving camera and a curriculum-trained reinforcement learning method (EARL) with sim-to-real generalization capability for full 6-DoF dynamic grasping of novel objects with no prior knowledge of the object's motion profiles.

Problem Definition: We focus on enabling coupled EoH systems to perform dynamic grasping in 6-DoF (i.e., SE(3)) of a moving object with a priori unknown motion. We make no assumptions about the shape or identity of target objects other than that they are rigid bodies and graspable by the end-effector. Additionally, the target object can move freely in the robot's reachable workspace (approachable by the robot). Completing this task with the EoH system requires another sub-task of tracking the moving object, following it with the robot's motion such that it keeps the target object in the FoV of the EoH camera while approaching the target. The task is successful if the robot can grasp and pick up the object.

Figure 2:
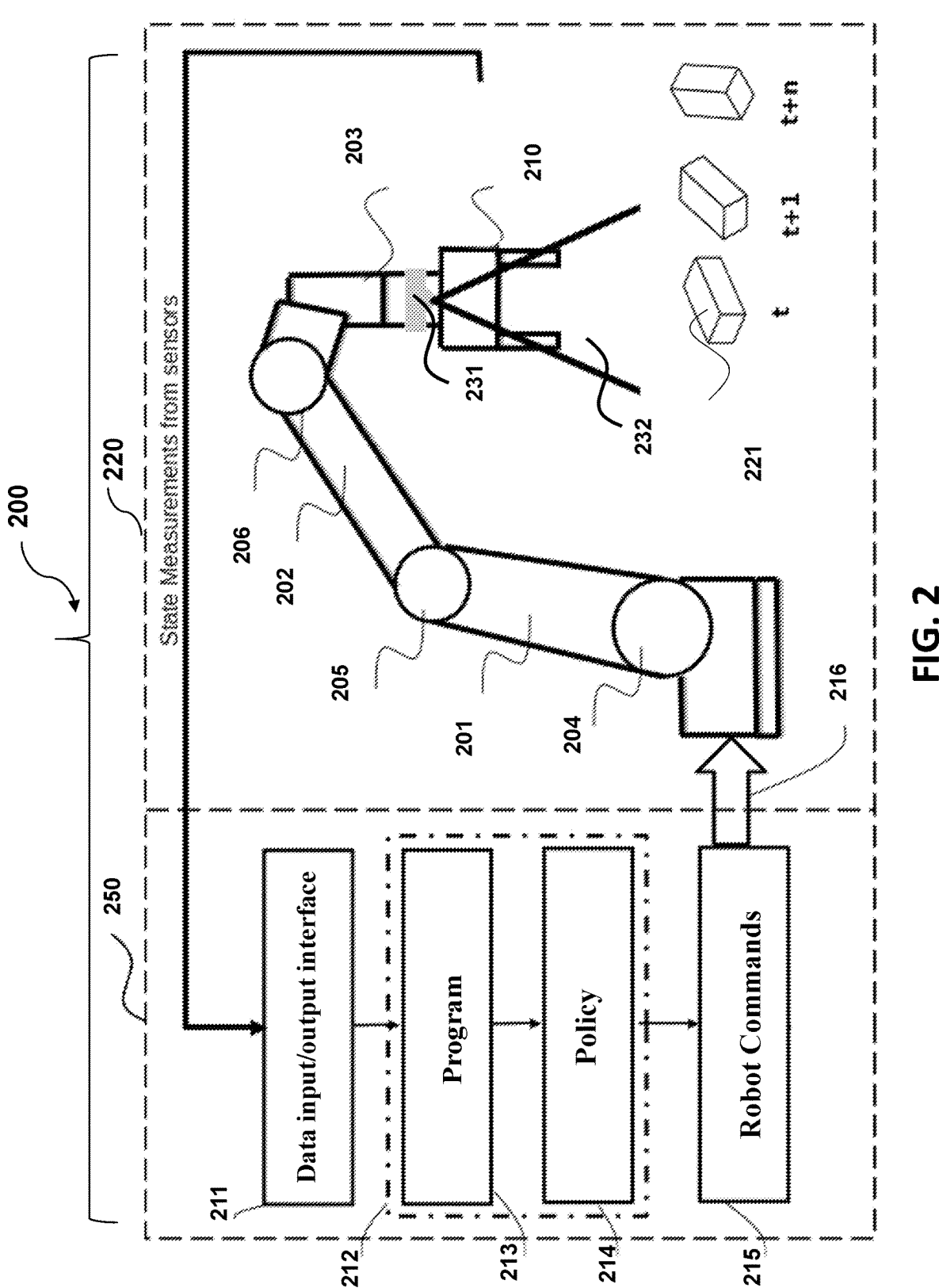
FIG. 2 shows a diagram illustrating an example of a system based on the proposed Eye-on-Hand reinforcement learner, according to embodiments of the present invention.

FIG. 1 shows Eye-on-Hand (EoH) system 100 with a wrist-mounted RGB-D camera as a vision sensor 110 and a robotic arm 120 as a manipulator. FIG. 2 shows a diagram illustrating an example of a system based on the proposed Eye-on-Hand reinforcement learner, according to embodiments of the present invention. The robotic system 200 may include a controller (robot controller) 250 and a robotic arm manipulator 220 equipped with sensors (not shown) for state measurements and a computer-instrumented system for storing data and controlling the manipulator arm 220. The controller 250 may include a data input/output interface (data input/output interface circuit) 211, a processor and a memory 212. The memory 212 is configured to store programs 213 and policy 214, which include an Eye-on-Hand (EoH) reinforcement leaner (EARL) policy, a physics-based simulator, an arm motion generation program. The manipulator arm 220 may include several rigid links 201, 202, 203 and joints 204, 205, 206. The manipulator arm 220 is controlled using a robot controller 250 that generates a command or task (robot commands) 215 that may be externally supplied to the system 200. The command or task 215 could be a control signal 216 that operates the actuators of the manipulator arm 220 for tracking or grasping an object 221 using grippers 210 of the manipulator. The robot controller 250 sends the control signal 216 to the robotic arm manipulator 220. The control signal 216 could be the torques or velocity or position commands to be applied at each of the joints 204, 205, 206 of the manipulator arm 220 and opening/closing of the gripper 210. The state of the robotic system is measured using the sensors. These sensors may include encoders at the joints 204, 205, 206 configured to detect the joint positions, velocity, and torque values, and a camera (vision sensor) 231 that can observe the environment of the robot. In this case, the camera 231 can be attached to the end-effector of the manipulator arm 220. The camera 231 has a field of view (FoV) 232. The EoH system (robotic system) 200 is configured to keep the object of interest 221 in the camera 231 FoV 232 by controlling the robot arm as the target object 221 is moving in the workspace. The state measurements from the sensors are sent to the data input/output interface 211 which stores the data received from the sensors. The robot controller 250 is initialized with a control policy 214 for a desired task. Several episodes of the control policy 214 are implemented on the robotic system 200 and the state measurement data from the sensors is collected in a data input/output interface 211. The data are then processed by the processer using the software containing computer program 212 for updating or executing the current policy 214 of the robotic system. The program 213 for updating the policy 214 may be the EARL method program for training or computing a step for the parameters of policy 214. The controller 250 then computes the robot commands (policy commands) 215, generates the control signal 216 based on the computed robotic commands 215 and transmits the control signals 216 to the actuators of the robotic arm manipulator 220 using the data input/output interface 211 for performing the desired task.

EARL Framework

In this section, we describe the various components of the framework. First, we present our framework overview. We then describe our visual processing unit that tracks target object poses in real-time. We then describe the grasp planning pipeline that continuously adapts grasp selection. Finally, we present our arm motion generation method based on curriculum-trained reinforcement learning (RL).

Grasping in a dynamic environment presents many challenges. A stable and reachable grasp can become unreachable and unstable as the target object moves. The EoH system can also lose track of the dynamic target object. We employ RL for EoH systems, where we learn a control policy (EARL) in simulations for dynamic grasping of arbitrary objects, and we propose to utilize the object's active pose information as visual feedback. Our proposed method enables dynamic grasping with active tracking of novel objects without explicit motion prediction requirements. First, we perform active pose estimation of the target with the moving EoH camera for providing visual feedback. In at least one embodiment, we select a design that continuously tracks the target object in 2D using learned features and subsequently performs pose estimation using a combination of 2D features and depth information to speed up the processing and ensure sufficient tracking accuracy.

Figure 3:
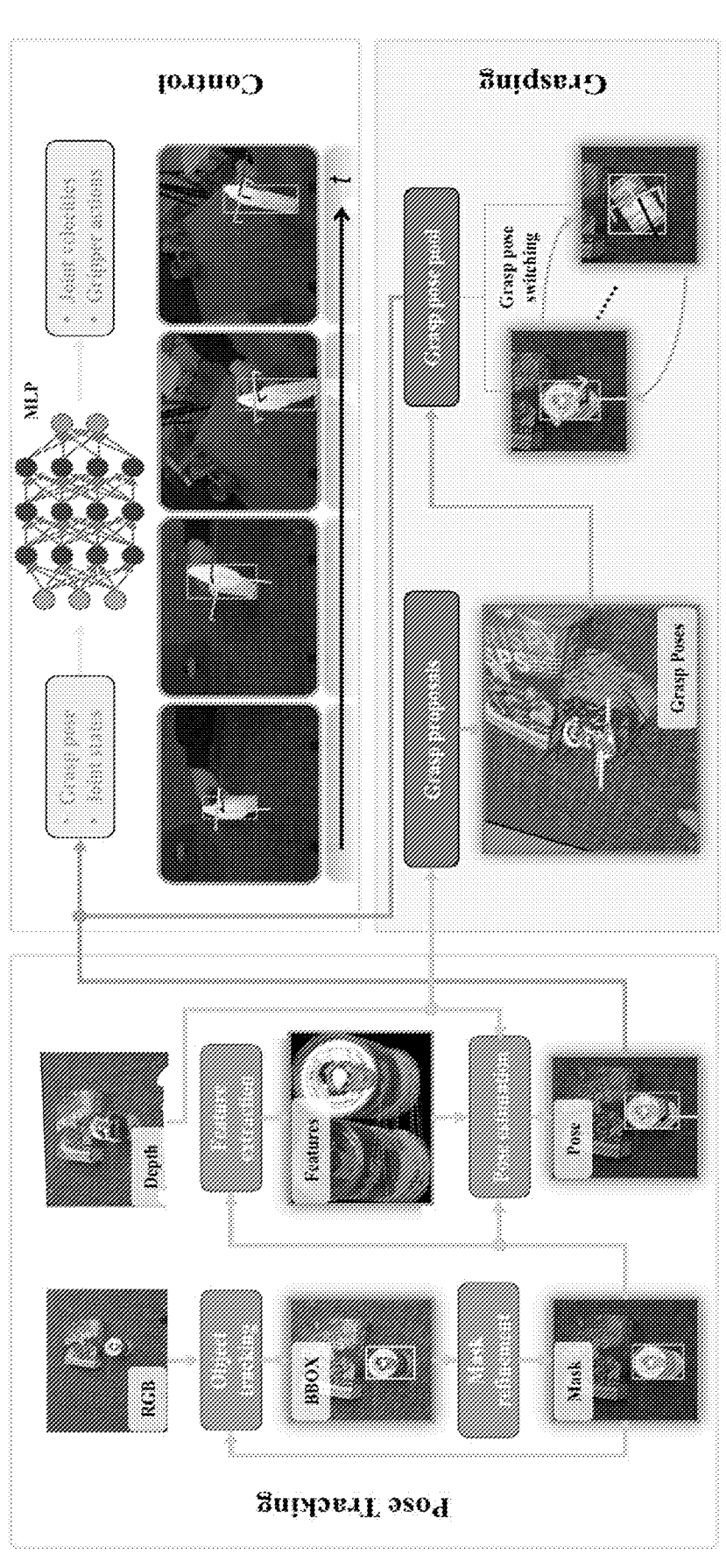
FIG. 3 shows a diagram illustrating the proposed EARL framework, according to some embodiments of the present invention.

In at least one embodiment, the control policy is a Proximal Policy Optimization (PPO) based RL framework in which we map object pose differentials to desirable robot arm joint velocities. Since we work with an EoH system, the robot arm must continuously adjust the pose of the RGB-D camera to keep the target object in the FoV. Simultaneously, the control policy must guide the end-effector to approach the object and grasp it. Achieving all these requirements naturally and smoothly in real-time is only possible through a finely tuned, multi-stage control policy. In at least one embodiment, we perform grasp planning with multiple grasp proposals on the target object and the best grasp pose is dynamically updated, which may happen as the target object continuously moves in the six degrees of freedom (6D). We dynamically select a suitable candidate for biasing the control policy actions. The overall framework is shown in FIG. 3, and the steps are detailed in the following sections. FIG. 3 shows RGB-D image input initializes object tracking and mask refinement for pose estimation components. The pose tracking module provides a 6D pose of the target object. A grasp pose pool is built from a grasp proposal network. The grasp planning module computes a suitable grasp pose on the target. The control policy commands the EoH system to track and finally grasp the target using the robot arm.

Active Object Pose Tracking

Active perception implies computer vision implemented with a movable camera, which can intelligently alter the viewpoint to improve the system's performance. In at least one embodiment, we consider tracking with an active camera. Many methods focus on top-down grasping where they constrain the target object in the 2D workspace. This case can be relatively simple. In this invention, we target grasp synthesis in 6-DoF, which requires the robot to be aware of the target object's 3D position and 3D orientation. In at least one embodiment, we perform 6D active pose estimation with the EoH system for tracking and computing an encoding of the target object from visual observations. Typically, 6D object pose estimation methods assume known object models and can categorize into correspondence-based, template-based, and voting-based. In this invention, we make no assumptions about the object's model and motion profile and continuously track the object's pose with the moving camera.

In at least one embodiment, given the first frame RGB-D image $I_0$ containing the target object O, we continuously track O's 6D pose relative to the camera at any time t in image $I_t$. In at least one embodiment, we realize this by a correspondence-based approach and leverage BundleTrack method for maintaining a keyframe memory pool and perform online pose graph optimization that takes both feature correspondences and dense pixel-wise correspondences from a depth image. To accomplish fast and active pose tracking of novel objects in motion using only a sequence of RGB-D images, we introduce several augmentations to enhance the BundleTrack. At time t, the pose tracking process starts with obtaining a bounding box $B_t$ of the target object, employing a transformer-based 2D object tracker, capable of tracking an object through multiple frames with a series of RGB images. We then enhance the fit of the bounding box $B_t$ with Alpha-Refine method and simultaneously obtain an object mask Mt. Alpha-Refine is a boosting method that extracts and maintains detailed spatial information. These augmentations support fast tracking and work with novel objects without requiring additional training or object models. We utilize the mask Mt to provide more accurate RGB and depth information as input to the BundleTrack, leading to direct performance gains for fast-tracking the 6D pose. A key component for correspondence-based pose estimation is the feature extractor. In at least one embodiment, we employ R2D2 feature detector, which predicts a set of sparse locations as object features in the input image that are repeatable and reliable for local feature matching and thus outperforms the LF-Net detector utilized in the BundleTrack. We note that the color image input to R2D2 contains only the target object cropped based on Mt. Our method enables more robust active pose tracking in real-time robot control.

Grasp Planning

In at least one embodiment, we use the first RGB-D image to initialize the pose tracking and compute grasp proposals. Selecting a good set of candidate grasp poses is important for two reasons. First, computing grasp poses on the fly is time-consuming, making it difficult to achieve real-time performance. Second, it is required to compute a desired output from a control policy towards a graspable pose on the moving object that drives the end-effector close to the target object. In at least one embodiment, for grasp planning, we compute a set of grasp poses using machine learning. In at least one embodiment, the machine learning model is based on Contact-GraspNet, which utilizes a raw depth image and object mask as input to generate a set of 6-DoF grasp proposals. This approach works on novel objects and environments without the need for fine-tuning.

Next, we compute a set of transformations from grasp poses to the 6D pose of the target object and store them in a grasp memory pool. All proposed grasp poses are relative to the target object's pose, which helps us avoid doing computationally expensive real-time grasp synthesis. In this invention, as both the EoH and the object move, the system dynamically chooses which grasp pose to track from the grasp memory pool at a given time. In at least one embodiment, the selection of the grasp pose is driven mainly by angular distance. We use quaternion representation to store the orientation information. At each control iteration, the orientation of gripper $q_g$ is compared with that of all grasp poses $q_i \in G$ via $$\Delta q_i = q_g * q_i^{-1}, \quad d_i = 2 \arcsin(\min(\|\Delta q_i\|, 1)).$$

The grasp pose with the smallest di is set to be the current target pose to be tracked.

Coupled Control of EoH System

Given active pose tracking and grasp planning for adjusting the target grasp for a moving object, next, the EoH system must track and follow the target and successfully perform dynamic grasping. Two constraints must be jointly satisfied by a policy to control the robot's approach and grasp the target object: maintaining the object in the camera's FoV and avoiding collisions, including self-collision.

In at least one embodiment, we develop a standard PD controller driven by an inverse kinematics (IK) solver for the control policy. We treat this solution as a baseline approach for performing dynamic grasping with the EoH system.

Baseline Control Policy

In at least one embodiment, given an end-effector goal as a grasp pose target to the EoH system at every frame, using the IK (damped least squares) we develop a servoing method which generates desired joint velocity commands using a PD control formulation. At a higher level, the servoing-based baseline repeatedly computes the pose of the next goal for the end-effector following a hand-designed trajectory optimization, shown in the FIG. 4.

The EoH system navigates the gripper (with pose $P_r$) "above" the object to a pose at some distance from the object, from where a straight-line movement of the gripper can lead to the desired grasp pose Pt. In the figure, this stage is achieved as $P_r$'s z-axis aligns with the object pose's z-axis. To realize the design, a pose waypoint for the gripper $P'_r$ can be computed as position $P'_{r.p}$ and rotation $P'_{r.q}$. The next position of pose $P_{r.p}$ needs to move the gripper toward the approaching direction (z-axis of $P_t$) while maintaining a fixed distance, $$r = P_{r.p} - P_{t.p} \vee \vee P'_{r.p} - P_{t.p} \vee .$$

Figure 4:
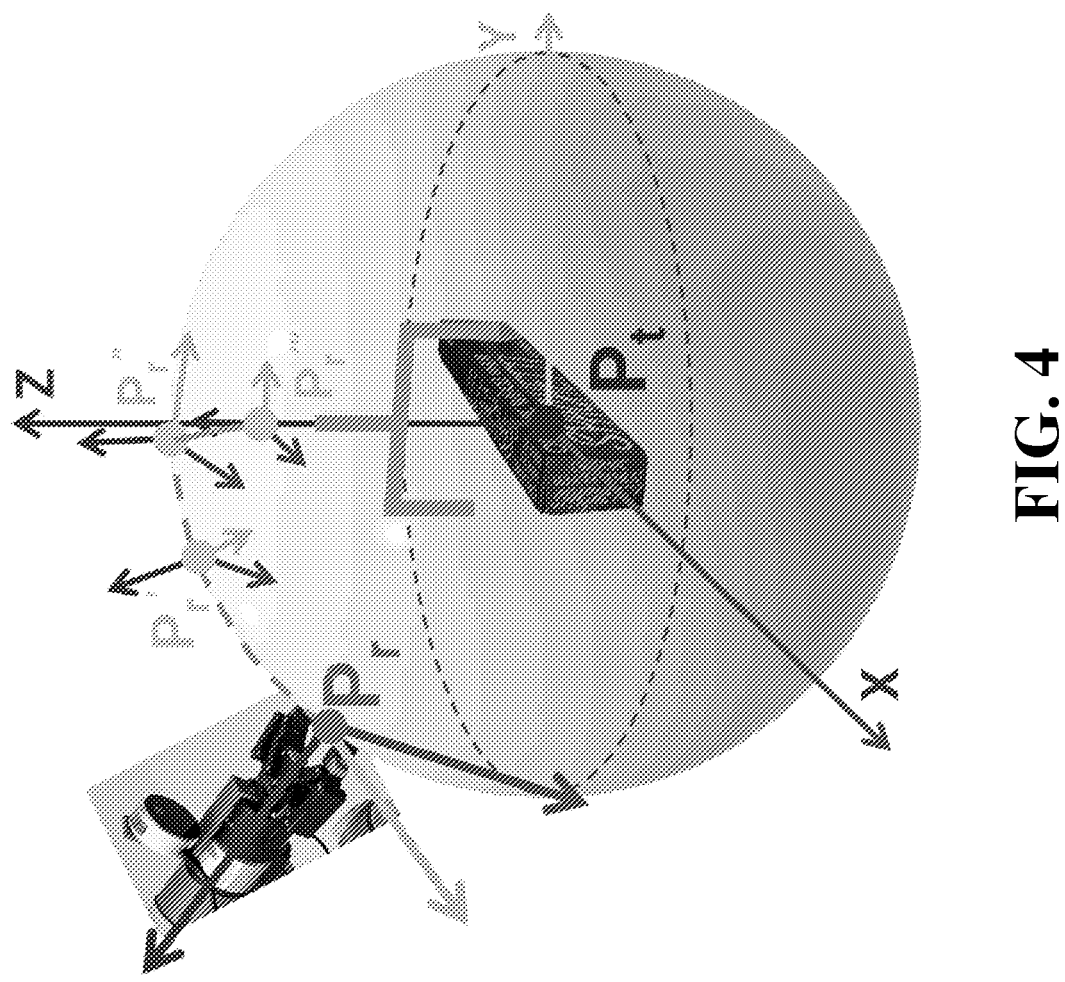
FIG. 4 shows an overview of training EARL with curriculum-trained reinforcement learning in simulations, according to embodiments of the present invention.

We realize this by moving on a sphere with a radius of r as shown in FIG. 4.4. If the z-axis between $P_r$ and $P_t$ are well aligned (smaller than a threshold $\theta_{align}$, set to 0.175 rad), then, r is decreased, otherwise, r is increased without exceeding $r_{max}$ (set to 30 cm).

Training EARL

In another embodiment, in this invention we propose an Eye-on-Hand reinforcement learner (EARL) as a control policy that directly maps the desired grasp pose and joint states to the robot's desired joint velocity and gripper actions. Training an RL model with many continuous DoFs is challenging due to long policy horizons and sparse reward signals. In our case, the challenge is compounded by the strong coupling between vision and manipulation subsystems.

In at least one embodiment, to effectively train EARL in simulations, we formulate the task as a single-agent Markov Game. In each episode, a target object (possibly among other objects) is randomly placed in the workspace. The target object may randomly translate and rotate in the 3D workspace (gravity is disabled so that the object can move in the air). The robot is tasked to grasp the target object using a specific grasp pose. The environment resets itself upon a grasp success/failure or if object tracking fails (out-of-view).

Figure 5:
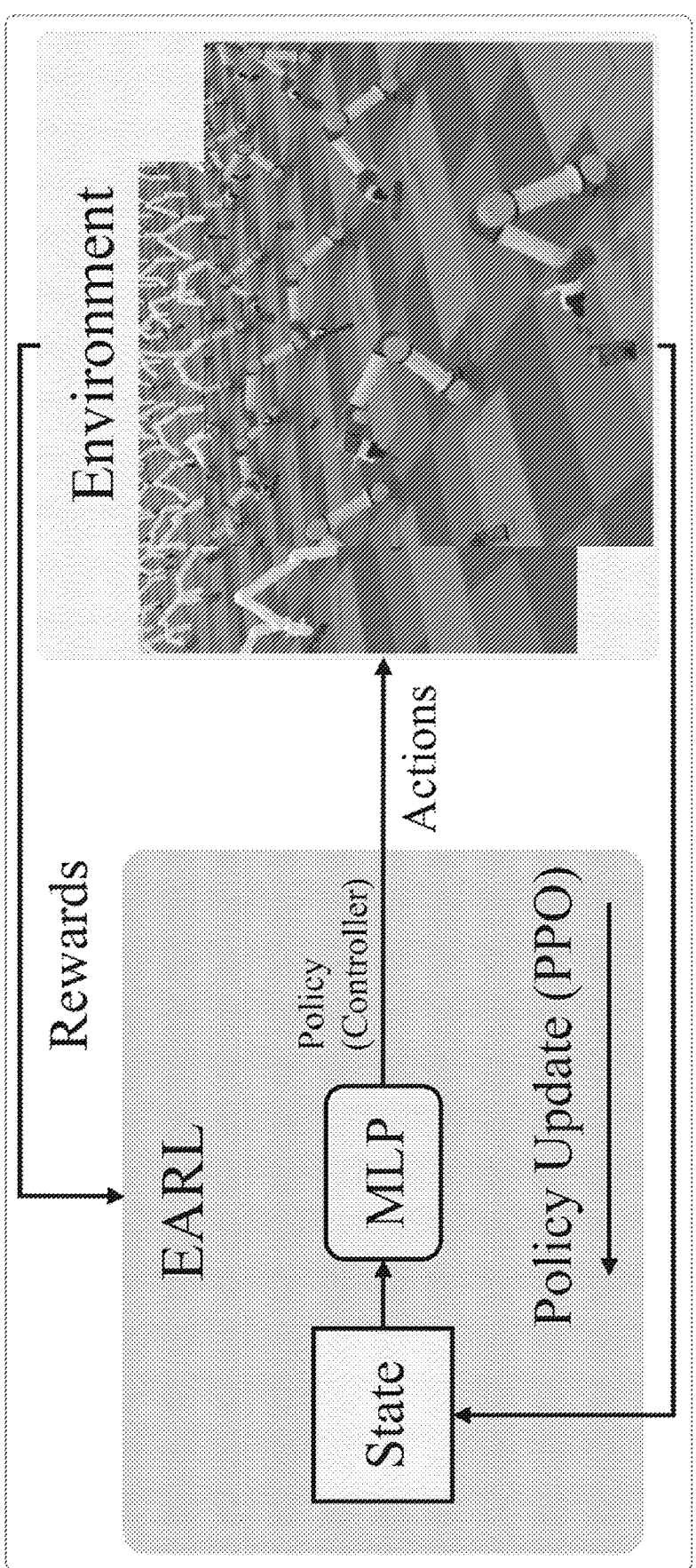
FIG. 5 shows an overview of the baseline control policy, according to embodiments of the present invention.

In at least one embodiment, we train EARL policy as RL Games with a PPO agent, which receives the state quantities of the target object and the EoH system and decides which action will be taken to execute dynamic grasping. In at least one embodiment, we employ Isaac Gym physics-based simulations for efficient RL and data acquisition, capitalizing on PPO's inherent support for parallel training. In at least one embodiment, we perform simultaneous simulations of thousands of independent EoH systems in Isaac Gym simulator for model training. The overview of training EARL is shown in FIG. 5. In at least one embodiment, the MLP for PPO has three hidden layers of size [256,128,64].

For input, the reinforcement learner needs information on the target object, which we provide as an encoding represented by the object's pose (translations and orientation), in addition to the state of the robotic arm. We describe a unique pose representation for the input. Because Euler angles have singularities and quaternions are non-unique, training the RL agent with such parameterizations can be difficult. In at least one embodiment, we use four keypoints to represent the translation and orientation of a rigid body. These keypoints can be represented in many ways, and in our settings, we describe them using the corners of a fixed size square where the square is selected to coincide with the XY plane of the coordinate system of the given object's pose, with its center coinciding with the origin of the pose coordinates. We represent the input as, $$S = [K_r, K_{rg}, K_{gg'}, J_p, J_v, c],$$

where $K_r$ are the keypoints of the gripper. Let $K_g$ be the target (grasp) keypoints, then $K_{rg} = K_r - K_g$ is the error that should be minimized (reach 0) for a successful grasp. $K = K_g - K_{g'}$ is the change of the target grasp keypoints between the current and previous frames. $J_p$ and $J_v$ are the robot arm's joint position and velocity vectors, respectively. $J_p$ is scaled to [0,1] depending on the rotation limits. c, a Boolean variable, indicates whether the gripper is closed or open. Policy actions, as the output of the MLP, are the velocity target for each robot's joint and a boolean command for the gripper. We choose joint velocities to control the robot arm because it results in comparatively smoother motions than position-based control.

Reward Shaping

The learning process can be much faster and successful through a suitable reward schedule with diverse guidance. In at least one embodiment, we carefully perform reward shaping to encourage the robot to grasp the target object fast and securely. On a high level, the problem can be seen as tracking and grasping. The tracking portion moves the end-effector closer to the desired grasp pose while maintaining the camera's view of the object and simultaneously avoiding collisions. The grasping component needs to determine an opportune moment for closing the gripper. We consider the case where the motion of the target object can be unpredictable, so the best strategy for the robot arm is to continuously track the target and grasp it at an opportune moment. We design the reward to have multiple components, $$R = P_{dist} + P_{view} + P_{coll} + P_{ove} + P_{alig} + P_{move} + R_{grasp}.$$

$P_{dist}$, a dense penalty, is the distance between the gripper pose and grasp pose, which encourages the robot to minimize $K_{rg}$. $P_{view}$ is a penalty given when the target pose is out-of-view. This penalty helps the active pose estimation with the moving camera by keeping the object in FoV. $P_{coll}$ is a penalty for any collision before grasping. $I_t$ is easy for the robot to keep the object in view and avoid collision by staying far from the target object, a behavior that must be avoided. For that, $P_{ove}$ penalizes the agent when the distance between the gripper and grasp pose is larger than a threshold. $P_{alig}$ is a helper to regularize arm motion and help with learning. It contains three parts, the z-axis alignment of the gripper and grasp pose, the y-axis alignment of the gripper and grasp pose, and the centering of the object in the camera view. The z-axis and y-axis alignments guide the robot's approach to the target. The closer the gripper is to the grasp pose, the higher probability the target object may collide with the robot or move out of the FoV, as the target object could randomly move. A $P_{move}$ penalty is introduced to keep the robot's gripper $\theta_d$ (set to 20 cm) away from the object if the speed of the object is faster than $v_o$ (set to 4 cm/sec).

$R_{grasp}$ is the reward for closing the gripper when the target object has been successfully grasped. We use the contact force of two fingers to determine whether the gripper has grasped the target object in the simulation.

Curriculum Design for Learning

Learning dynamic grasping can be challenging for EoH systems, and training such a network from scratch with many continuous DoFs is challenging. In this invention, we present a curriculum design to train the EoH system efficiently. In at least one embodiment, we use a three-stage curriculum, gradually increasing the task's difficulty and dynamically changing the rewards scalar for efficient learning.

In the first stage, the object is randomly placed in the workspace, and the robot's gripper is randomly sampled closer toward the grasp pose on the object. The object randomly moves at a low speed ($\leq v_o$ cm/sec). In addition, an episode is not terminated when the object is out-of-view. These relaxations significantly limit the initial search space to help training. Once the success rate of the initial policy is over a threshold, in the second stage of training, the environment will reset once the object is out-of-view, denoting task failure. The penalty for $P_{view}$, $P_{coll}$, $P_{ove}$, $P_{move}$ are increased, and they will continue to increase to reinforce that the robot should avoid these unwanted scenarios. Low penalty causes the policy to be aggressive, which leads to high collision rates or not keeping the object in view. On the other hand, a high penalty discourages the robot from approaching the object. We dynamically change penalty scales to encourage different behaviors and achieve a high success rate. In the last stage, we let the object move faster (the max $v_o$ is set to 8.5 cm/sec), and the robot gripper is fixed far from the target object at the start of each episode, working in the full workspace.

The RL training parameters are identical for robots. The only difference is that the penalty scales of $P_{view}$ and $P_{coll}$ are set to be lower for Kinova due to the robot's kinematics, which has long links between joints, making it comparatively harder to train.

Once trained, our policy EARL runs in real-time on new objects and the training time amounts to just ~4 hours of the learning experience.

Direct Sim-to-Real Adaptation

A goal of EARL is to have RL agents trained in a simulator directly applicable to real-world EoH systems. In at least one embodiment, we developed an effective technique of independent interest based on an observation that the sim-to-real gap does not strongly correlates with a control policy, and we encode visual observations as high-level representations. Instead, the gap is mainly caused by parameter differences between the simulation and the real system. With this observation, we decouple the sim-to-real gap reduction from training EARL. In at least one embodiment, using only the baseline PD-based controller, running in both simulation and real-world EoH systems, we fine-tuned the necessary parameters to reduce the sim-to-real gap. For example, because real robot arms are torque-controlled at a lower level, damping parameters must be appropriately adjusted to realize accurate joint velocity control.

Evaluation

Figure 6C:
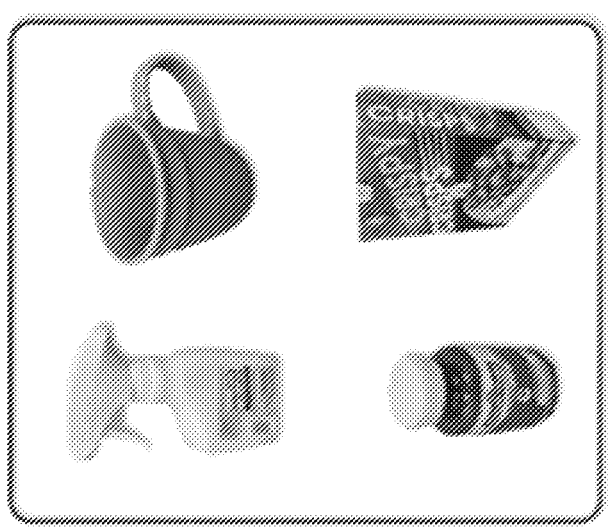
FIG. 6C shows real-world test set objects, according to embodiments of the present invention.
Figure 6A:
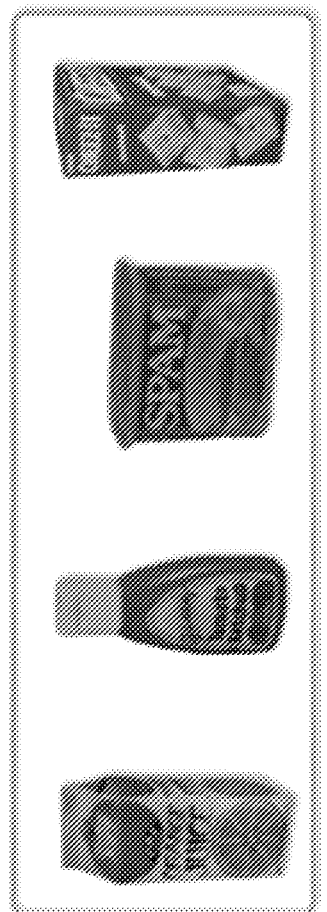
FIG. 6A shows the training set objects used in simulation for training the policy, according to embodiments of the present invention.
Figure 6B:
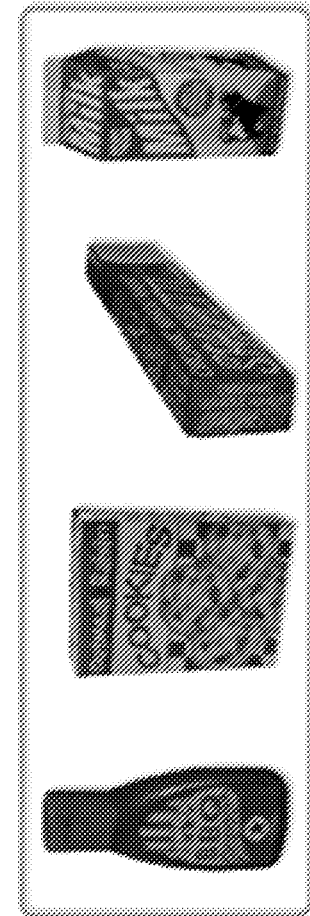
FIG. 6B shows validation set objects used in simulation for training the policy, according to embodiments of the present invention.
Figures 7A, 7B, 7C, 7D:
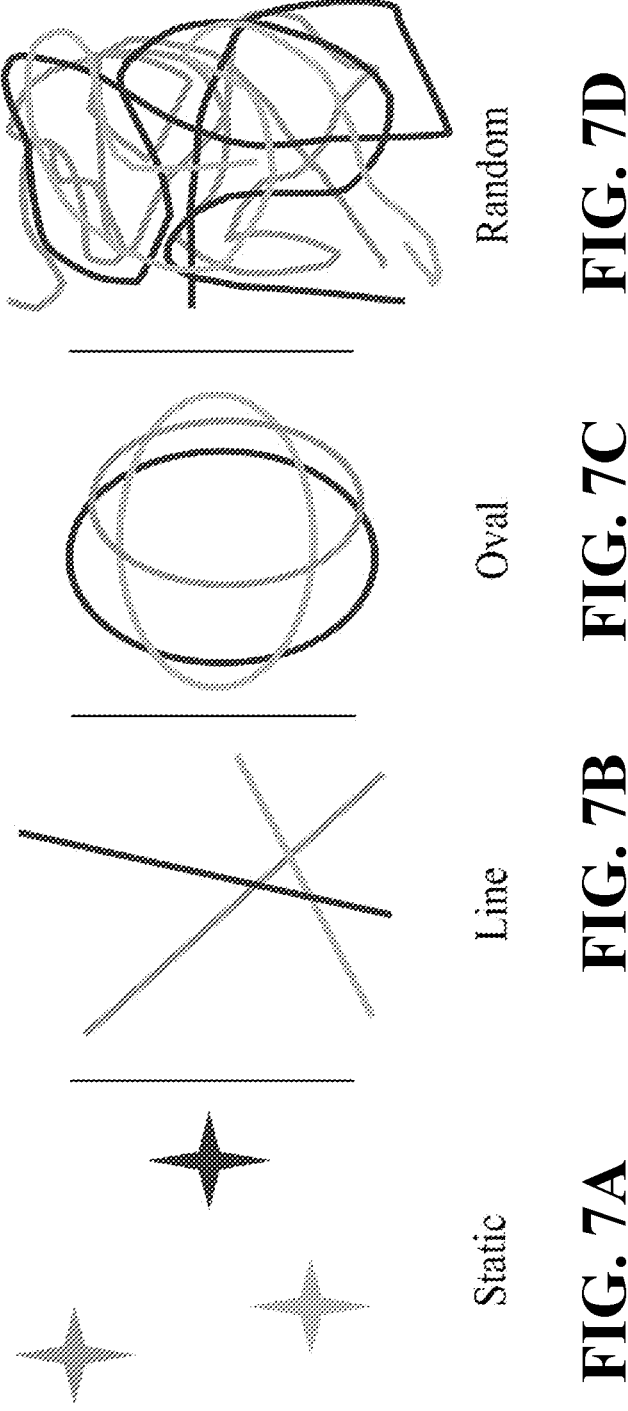
FIG. 7A-7D shows four motion patterns of the target objects that are considered in the evaluation and illustrates these motions in 2D for visualization purposes, which happen in 3D and 6D, according to embodiments of the present invention.

We evaluated the proposed methods both in simulation (Issac Gym) and on two robotic arms (Universal UR-5e 6-DoF (R1) and Kinova Gen3 7-DoF (R2)) as EoH systems. Both robots are equipped with a two-finger Robotq 2F-85 gripper and an Intel RealSense L515 camera as vision sensor. The workspace for training is a cubic region of $40\times40\times40$ cm³. We evaluated our system on machines with a single GPU (Nvidia 3090, uses 8 GB memory). Our method can handle novel objects for which grasp poses can be reasonably tracked, allowing us only to use a few objects (four) for training. We tested simulation and the real world with four unseen sets of objects each. Objects are selected from the YCB and HOPE datasets; and some random household items. FIG. 6A-6C shows these objects. The pipeline runs at 15 FPS.

Simulation Experiments and Results

The main objective of simulation experiments is to evaluate the control policies Baseline and EARL for the dynamic grasping problem. In simulation experiments, similar to training, the simulator gives the object's pose, and we use one grasp per trial. To evaluate the policy, we created test cases that have four different motions as shown in FIG. 7A-7D.

Static(S): Objects are randomly sampled in the workspace.

Linear (L): Line paths are randomly sampled from boundary to boundary.

Oval (O): Oval paths in the plane are randomly sampled, and the objects stop moving at a random time step. The z-axis is also randomly sampled beforehand.

Random (R): The object randomly moves for some time, then stops moving for five seconds and repeats.

The object randomly moves with speed along any dimension set to a max. for translation, and for rotation. In the simulation, the target object never stops moving, even when slowed down considerably at random; it will "vibrate" around the center of mass to simulate uncertainty.

We evaluate our method using the success rate, where the robot successfully grasped the target object in a given time (timeout). Three failure conditions are recorded: (1) collision, (2) losing track of the target object, and (3) the maximum episode length is reached. Since active pose estimation is not performed in the simulation experiments, checking that an object is out of view is done by checking the object's pose center is beyond a certain threshold (in our experiments) away from the simulated camera's principal axis. The maximum time per trial is 35 seconds (timeout). The robot is required to approach the target object and execute a swift grasp when appropriate.

We generated one thousand test cases in simulations across the motion types and test objects and repeated them for five trials. EARL control policy outperforms the baseline method on both robot systems R1 and R2, as shown in FIG. 9. The baseline method achieves an average success rate of. EARL demonstrates an excellent average success rate of. The primary failure mode of EARL is timeout due to the high penalty for collision and out-of-view, which encourages the robot to move conservatively toward the target object. Timeout failure for EARL is relatively low in random motion settings, likely due to the training being performed only using the case of random object motion. Nevertheless, EARL performs for other object motion types. In comparison, the performance of the baseline method goes down significantly as the difficulty of the task increases.

Real-World Experiments and Results

The real experiments use actual perception and perform grasp planning with pose tracking by the EoH system. A human operator moves the object freely in the workspace based on the task scenario. We perform four motions (S/L/O/R) from simulation experiments to analyze the sim-to-real performance gap. The grasp pose pool is limited to one for a fair comparison. We also perform two more motion tasks for testing adaptive grasp switching: random and complex.

13

Figures 8A, 8B, 8C:
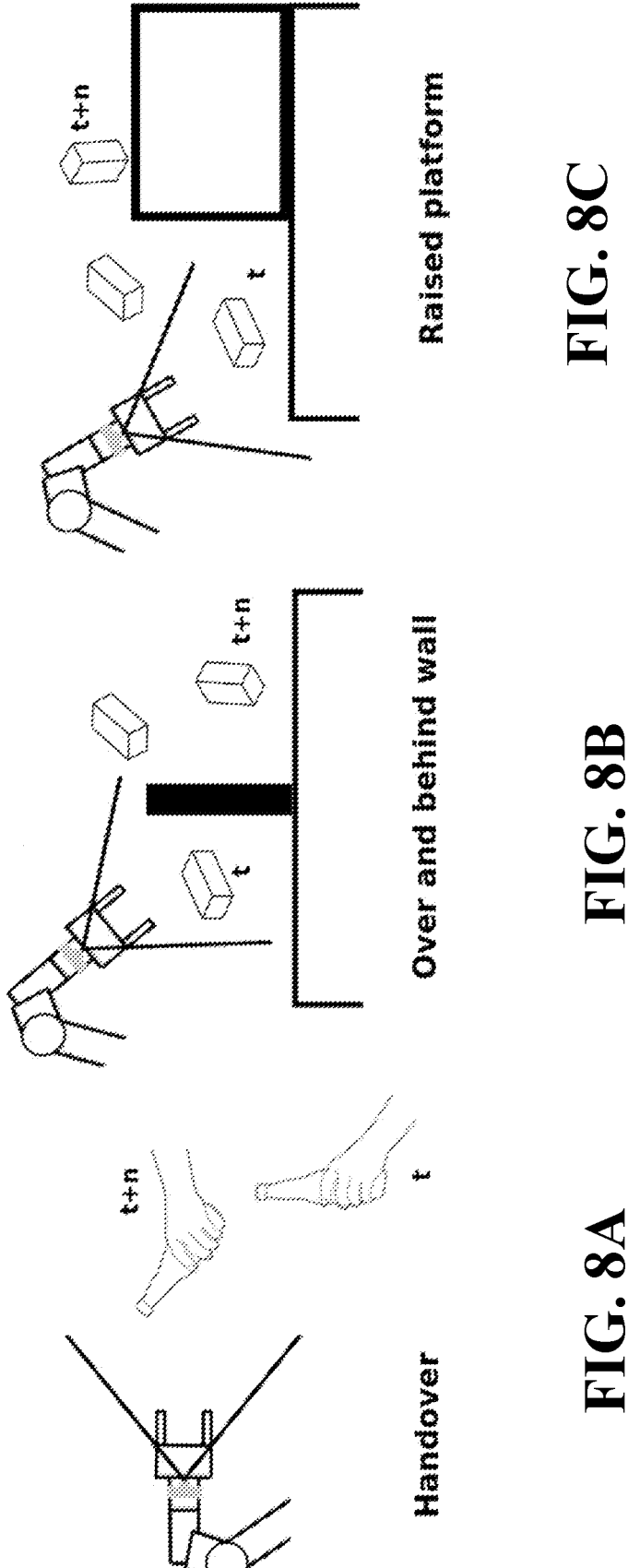
FIG. 8A-8C shows experimental tasks used to evaluate EARL in challenging setups, according to embodiments of the present invention.

The former executes random movements of the object, forcing a grasp pose switch to achieve success. The complex tasks involve a combination of motion types. These include three challenging tasks, as described in FIG. 8, which demonstrate generalization capability. FIG. 8A-8C shows three experimental tasks used to evaluate EARL in challenging setups. FIG. 8A shows handover/external workspace task which demonstrates that the system works outside the trained workspace and can perform human-robot handover. FIG. 8B shows over and behind wall task which demonstrate that the system can overcome occlusions typical external camera setup faces by tracking across a barrier. FIG. 8C shows the task of placing on raised platform box which demonstrates that the system can handle significant elevation changes.

We performed real robot trials as the EoH system for each method and motion type with each test object using random start and end positions (20 trials for each motion type per method). We ensure each trial is consistent across both methods. FIG. 10 show these results. EARL outperforms the baseline method for all test cases achieving an average success rate of 91.25%, versus 73.75% with the baseline. Note that EARL policy is trained entirely in simulations. Comparing the simulation results demonstrates that we accomplish a small sim-to-real gap (less than 5%) on the motions (S/L/O/R) with our sim-to-real adaptation. Furthermore, EARL also performed well on the random motion tasks and complex tasks with adaptive grasp switching, achieving an average success rate of 90% and 80%, respectively. From our observation, the pose tracking module is bottleneck for achieving dynamic grasping without explicit modeling of motion prediction. We perform active pose tracking with object-level SLAM by considering texture, geometric information, and robust features; still, the RGB image suffers from motion blur and the depth image from noisy reflections and inaccurate measurements, affecting performance. Moreover, object tracking can suffer from complex backgrounds and deficiency of texture on the object itself. Despite that, EARL performs well in complex tasks such as human-robot handover and moving over and behind a barrier, overcoming object occlusion limitations that external camera setups typically face.

Some embodiments of the present invention provide a framework for enabling EoH systems to perform 6-DoF dynamic grasping using visual sensory inputs with active pose tracking and a curriculum-trained RL method. Our method relates sensing to actuation and applies to complex robotic tasks utilizing visual feedback for eye-in-hand control. We validated our contributions through extensive experiments in simulations and complex real-world tasks, attaining a high success rate on previously unseen objects. Our framework is generic concerning the task, but it does not consider explicit collision modeling, and the target cannot move faster than the robot. In the future, we will focus on mechanisms for recovering the target in case of tracking failures and handling more cluttered environments.

The above-described embodiments of the present invention can be implemented in any of numerous ways. For example, the embodiments may be implemented using hardware, software or a combination thereof. When implemented in software, the software code can be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A controller for performing dynamic grasping of a target object using a robotic arm and visual sensory inputs, comprising:

a data input/output interface configured to receive state measurements of the robotic arm and the target object from sensors arranged on the robotic arm, wherein the robotic arm includes links connected by joints having actuators and encoders, and a gripper of an end-effector of the robotic arm configured to grasp the target object in response to robot control signals, wherein the sensors include a vision sensor configured to continuously provide visual observations for tracking poses of the target object in a workspace and compute grasp poses;

a memory configured to store an Eye-on-Hand (EoH) reinforcement leaner (EARL) policy, a physics-based simulator, an arm motion generation program; and a processor, in connection with the memory, configured to perform steps of:

training the Eye-on-Hand reinforcement learner (EARL) policy, wherein for the training of the EARL policy, the processor is configured to train a neural network to learn a control policy for the dynamic grasping, and the training of the neural network to learn the control policy is based on a curriculum design that gradually increases task difficulty and adapts reward function design;

tracking the poses of the target object moving in the workspace based on the state measurements;

computing a set of grasp poses on the target object and dynamically selecting a desired grasp pose on the target object moving in the workspace;

computing robotic arm motion commands using the trained Eye-on-Hand reinforcement learner policy;

generating the robot control signals based on the computed robotic arm motion commands; and transmitting, via the data input/output interface, the robot control signals to the actuators of the joints and the gripper to follow the target object while keeping the target object in a field of view of the vision sensor and grasp the target object in the workspace.

2. The controller of claim 1, wherein the vision sensor is mounted on a distal end of the robotic arm adjacent to the gripper.

3. The controller of claim 1, wherein the vision sensor is an onboard camera sensor, wherein the visual observations provided by the onboard camera sensor constitutes image data comprising information of a depth channel, a first color channel, a second color channel, and a third color channel.

4. The controller of claim 3, wherein the visual observations are encoded as a high-level representation or an encoding of the target object.

5. The controller of claim 3, wherein the vision sensor provides the visual observations to the processor, wherein the processer computes a spatial location of the target object as a six-dimensional (6D) pose of the target object in the workspace indicative of a position and orientation of the target object relative to a camera frame of the vision sensor, or the gripper, or the base frame of the robotic arm.

6. The controller of claim 1, wherein the EARL policy generalizes to work on target objects which are not used for training the EARL policy, and a model or identity of the target object is not known, and the motion of the target object is not explicitly modeled or known a priori for the dynamic grasping.

7. The controller of claim 1, wherein the dynamic grasping is performed in six degrees of freedom (DoF).

8. The controller of claim 1, wherein the target object moves in a linear, circular, or random pattern including random motions in the workspace.

9. The controller of claim 1, wherein the processor computes the set of grasp poses on the target object relative to a first pose of the target object derived from the visual observations, and dynamically selects a location for the desired grasp pose on the target object based on the first pose of the target object.

10. The controller of claim 1, wherein the control policy maps the desired grasp pose and joint states to at least one of a desired joint velocity of the robotic arm or a position of the robotic arm for tracking the target object and gripper actions including opening and/or closing the gripper to perform a desired grasp on the target object.

11. The controller of claim 10, wherein the joint states include one or more of the joint positions, velocity, and torque values.

12. The controller of claim 10, wherein parameters of the neural network for the control policy to perform the dynamic grasping are learned with reinforcement learning.

13. The controller of claim 10, wherein the control policy is learned in simulations, wherein parallel training of the control policy is performed in simultaneous simulations with one of more independent Eye-on-Hand systems in a physics-based simulator.

14. The controller of claim 10, wherein the control policy for the dynamic grasping is learned using one or more real robotic arms.

15. The controller of claim 10, wherein the reward function design to train the control policy has multiple components with diverse guidance.

16. The controller of claim 1, wherein the learned control policy runs in real-time for the continuous degree of freedom of the Eye-on-Hand system.

17. The controller of claim 1, wherein the control policy trained in a simulator is applicable to real-world Eye-on-Hand systems with parameter tuning.

18. A system for performing dynamic grasping of a target object using visual sensory inputs, comprising:

a robotic arm configured to include links connected by joints having actuators and encoders, and a gripper of an end-effector of the robotic arm configured to grasp the target object in response to robot control signals;

sensors arranged on the robotic arm, wherein the sensors are configured to measure state measurements of the robotic arm and the target object, wherein the sensors include a vision sensor configured to continuously provide visual observations for tracking poses of the target object in a workspace and compute grasp poses; and a controller comprising:

a data input/output interface configured to receive the state measurements of the robotic arm and the target object from the sensors;

a memory configured to store an Eye-on-Hand (EoH) reinforcement leaner (EARL) policy, a physics-based simulator, an arm motion generation program; and a processor, in connection with the memory, configured to perform steps of:

training the Eye-on-Hand reinforcement learner (EARL) policy, wherein for the training of the EARL policy, the processor is configured to train a neural network to learn a control policy for the dynamic grasping, and the training of the neural network to learn the control policy is based on a curriculum design that gradually increases task difficulty and adapts reward function design;

tracking the poses of the target object moving in the workspace;

computing a set of grasp poses on the target object and dynamically selecting a desired grasp pose on the target object moving in the workspace;

computing robotic arm motion commands using the trained Eye-on-Hand reinforcement learner policy;

generating the robot control signals based on the computed robotic arm motion commands; and transmitting, via the data input/output interface, the robot control signals to the actuators of the joints and the gripper to follow the target object while keeping the target object in a field of view of the vision sensor and grasp the target object in the workspace.

19. The system of claim 18, wherein the control policy maps the desired grasp pose and joint states to at least one of a desired joint velocity of the robotic arm or a position of the robotic arm for tracking the target object and gripper actions including opening and/or closing the gripper to perform a desired grasp on the target object.

*     *     *     *     *